United States Patent
Murphy et al.

(10) Patent No.: US 7,282,273 B2
(45) Date of Patent: Oct. 16, 2007

(54) GREASE RESISTANCE AND WATER RESISTANCE COMPOSITIONS AND METHODS

(75) Inventors: Christopher B. Murphy, Woodridge, IL (US); Jon O. Fabri, Charleston, SC (US)

(73) Assignee: Polymer Ventures, Inc., Charleston, SC (US)

( * ) Notice: Subject to any disclaimer, the term of this patent is extended or adjusted under 35 U.S.C. 154(b) by 62 days.

(21) Appl. No.: 11/259,491

(22) Filed: Oct. 26, 2005

(65) Prior Publication Data

US 2007/0092718 A1    Apr. 26, 2007

(51) Int. Cl.
*B32B 23/08* (2006.01)
*B32B 27/10* (2006.01)
*B05D 3/02* (2006.01)
*C08L 91/06* (2006.01)

(52) U.S. Cl. ............. 428/514; 427/391; 427/395; 428/341; 428/342; 428/486; 524/275; 524/276; 524/277; 524/279; 524/487; 524/489

(58) Field of Classification Search ............. 427/391, 427/395; 428/341, 342, 486, 514; 524/275, 524/276, 277, 279, 487, 489
See application file for complete search history.

(56) References Cited

U.S. PATENT DOCUMENTS

| | | | |
|---|---|---|---|
| 3,957,574 A | 5/1976 | Anderson | 162/167 |
| 4,097,297 A | 6/1978 | Keene | 106/177 |
| 4,117,199 A | 9/1978 | Gotoh et al. | 428/486 |
| 4,222,820 A | 9/1980 | Hiskens et al. | 162/158 |
| 4,576,867 A | 3/1986 | Miyamoto | 428/342 |
| 5,110,390 A | 5/1992 | Martini et al. | 156/244 |
| 5,151,404 A | 9/1992 | Suzuki et al. | 502/200 |
| 5,180,614 A | 1/1993 | Escabasse | 428/34.2 |
| 5,283,090 A | 2/1994 | Umemura | 428/35.4 |
| 5,423,911 A | 6/1995 | Coutelle et al. | 106/416 |
| 5,468,526 A | 11/1995 | Allen et al. | 428/35.4 |
| 5,580,409 A | 12/1996 | Andersen et al. | 156/210 |
| 5,620,793 A | 4/1997 | Suzuki et al. | 428/342 |
| 5,626,945 A | 5/1997 | Berzins et al. | 428/174 |
| 5,635,279 A | 6/1997 | Ma et al. | 428/174 |
| 5,648,164 A | 7/1997 | Sakaki et al. | 428/341 |
| 5,654,039 A | 8/1997 | Wenzel et al. | 427/391 |
| 5,660,622 A | 8/1997 | Nikoloff | 106/287.34 |
| 5,660,900 A | 8/1997 | Andersen et al. | 428/35.6 |
| 5,683,772 A | 11/1997 | Andersen et al. | 160/36.4 |
| 5,763,100 A | 6/1998 | Quick et al. | 428/486 |
| 5,773,131 A | 6/1998 | Dettling | 428/201 |
| 5,795,932 A | 8/1998 | Dragner et al. | 524/276 |
| 5,800,647 A | 9/1998 | Andersen et al. | 156/69 |
| 5,837,383 A | 11/1998 | Wenzel et al. | 428/486 |
| 5,843,544 A | 12/1998 | Andersen et al. | 428/36.5 |
| 5,928,741 A | 7/1999 | Andersen et al. | 428/35.7 |
| 5,981,011 A | 11/1999 | Overcash et al. | 428/40.9 |
| 6,113,978 A | 9/2000 | Ornstein et al. | 427/136 |
| 6,159,612 A | 12/2000 | Chu et al. | 428/484 |
| 6,379,497 B1 | 4/2002 | Sandstrom et al. | 162/123 |
| 6,479,105 B2 | 11/2002 | Chang et al. | 427/385.5 |
| 6,576,086 B1 | 6/2003 | Ettl et al. | 162/164.3 |
| 6,919,111 B2 | 7/2005 | Swoboda et al. | 428/34.2 |
| 2004/0005341 A1* | 1/2004 | Dixit et al. | 424/401 |
| 2005/0042443 A1 | 2/2005 | Miller | |
| 2006/0148915 A1* | 7/2006 | Floyd et al. | 521/61 |

FOREIGN PATENT DOCUMENTS

GB    2 185 404 A    12/1986
WO    WO 02/14426 A1    2/2002

OTHER PUBLICATIONS

Grant & Hack's Chemical Dictionary, Fifth Edition, p. 628 (1987).*

* cited by examiner

*Primary Examiner*—D. S Nakarani
(74) *Attorney, Agent, or Firm*—Nelson Mullins Riley & Scarborough, LLP

(57) ABSTRACT

A method of improving grease and/or water resistance of a material is disclosed that comprises treating the material with wax and poly(vinyl alcohol) and optionally with a polyamine. Compositions for practicing the method and materials that have been treated by the method are also disclosed.

45 Claims, No Drawings

GREASE RESISTANCE AND WATER RESISTANCE COMPOSITIONS AND METHODS

BACKGROUND OF THE INVENTION (1) Field of the Invention

The present invention relates to compositions and methods to impart grease resistance and/or water resistance to materials, and more particularly to compositions and methods of improving grease resistance and/or water resistance that are free of fluorochemical compounds.

(2) Description of the Related Art

Materials, such as paper and textiles, are commonly treated or coated to improve their resistance to liquids such as water, grease and oil. Commercial compounds such as Scotchgard™® and Scotchban®, both products of Minnesota Mining and Manufacturing Co. have been widely used to improve the barrier properties of papers, textile fabrics, nonwoven fabrics, upholstery, carpet fibers, and the like.

Scotchgard™® and Scotchban®, and similar products, contain fluorochemicals, which have recently become the object of health and environmental concerns because of their persistence and tendency to bioaccumulate. Consequently, there is strong interest in replacing fluorochemical compounds such as perfluorooctane sulfonate (PFOS), perfluorooctanoate (PFOA), polytetrafluoroethylene (PTFE), perfluoro-n-decanoic acid (PFDA) and other perfluorinated compounds that are widely used for imparting grease, oil, and/or water resistance to the substrates to which they are applied.

Recently several products have been introduced into the marketplace as potential replacements for the fluorochemical compounds. These materials are based on inorganic materials like silica and on organic polymers, or combinations of those materials. However, to date, these replacements have fallen short of the cost/performance standards established by the fluorinated compounds in this area of use.

It is well known to modify the barrier properties of various materials by the addition of a wax, and paraffin waxes have been used in many of these techniques. Examples of the use of waxes for surface treatment, coating, and the like can be found in U.S. Pat. No. 4,117,199. In U.S. Pat. No. 4,097,297 to Keene, an oil and water repellant barrier coating is described that consists essentially of a film forming polymer, a fluorochemical surface tension modifier, and a plasticizer. Waxes, coalescing solvents, and dyes are optionally included.

Poly(vinyl alcohol) has been widely used in films and coatings for properties that range from water dispersibility to barrier properties. Examples of these uses are found in U.S. Pat. Nos. 5,468,526, 5,110,390, 5,283,090, 6,113,978, US 2005/0042443 A1, and GB 2 185 404A, among others. In U.S. Pat. No. 5,981,011 to Overcash et al. a coated sheet material is described that has as one component a barrier coating comprising a polymer mixture in which one polymer can be poly(vinyl alcohol).

Several references describe circumstances where either paraffin wax or poly(vinyl alcohol) can be used for one purpose or another. For example, in U.S. Pat. No. 5,620,793 to Suzuki et al., a printing paper is provided that has no special coating on the printing face and does not cause bronzing in ink-jet printing. The paper also comprises an ink penetration-retarding agent on the printing face that can be, among other things, either poly(vinyl alcohol) or paraffin wax. In U.S. Pat. No. 5,648,164 to Sakaki et al., a recording paper is described in which both poly(vinyl alcohol) or paraffin wax are mentioned as potential ink penetration-retarding agents. In U.S. Pat. No. 6,919,111, to Swoboda et al., a cellulosic multi-ply paperboard is described that contains predominantly cellulosic fibers, a bulk and porosity enhancing additive, and a size press applied binder coating. The paperboard can be coated with either a binder, such as poly(vinyl alcohol), or with a wax. A similar composition having a coating of either a binder such as poly(vinyl alcohol) or a wax is described in U.S. Pat. No. 6,379,497, to Sandstrom et al.

In U.S. Pat. No. 5,843,544 to Andersen et al., hinged starch-bound cellular matrix clam-shell type containers are described that can be coated on the interior with a wax coating. The container can also be coated on the exterior with an elastomeric coating that can comprise poly(vinyl alcohol) in order to strengthen the outer surface and reduce its tendency to fracture during the hinging action. Similar articles produced from a starch-bound cellular matrix reinforced with dispersed fibers and having optional coatings of materials such as poly(vinyl alcohol) or wax are discussed in U.S. Pat. Nos. 5,660,900 and 5,683,772 to Andersen et al.

Wenzel et al., in U.S. Pat. Nos. 5,654,039 and 5,837,383, describe recyclable and compostable coated paper stock comprising a substrate having a primer coat that can be poly(vinyl alcohol) and, in addition, having a top coat that can include a wax composition, which can be a paraffin wax. However, mixtures of primer coat and top coat materials are not described.

In U.S. Pat. No. 5,626,945 to Berzins et al. and U.S. Pat. No. 5,635,279 to Ma et al., repulpable, water repellant paperboard is described that has a coating comprising a wax component that can be a paraffin wax, mixed with a polymer matrix of polymer chains ionically cross-linked through pendant carboxylate groups. A preferred polymer matrix was described as comprising a polystyrene-butadiene polymer copolymerized with a monomer having carboxylic acid pendant groups. In the U.S. Pat. No. 5,635,279; poly(vinyl alcohol) is described as being an ionically cross-linkable polymer that could be used in the invention, however, some carboxylate functionality must be added to the polymer prior to use by copolymerizing with a monomer having carboxylic acid pendant groups.

Other references have described the use of both waxes and substances such as poly(vinyl alcohol) for various purposes, in particular in the field of surface preparations for paper and textiles. For example, U.S. Pat. No. 5,151,404 to Suzuki et al. describes thermosensitive recording paper that does not curl and provides clear images with high image density. The inventors claim that paraffin wax can be used as a sizing agent in the paper, and poly(vinyl alcohol) can be used as a stiffness-imparting agent.

U.S. Pat. No. 5,763,100 to Quick et al., describes recyclable acrylic coated papers that have water and grease resistance and limited moisture vapor transmission characteristics. The papers can have a primer coat, which is commonly a water-based dispersion of a polymer such as poly(vinyl alcohol), and a further coating of a water-based emulsion of an acrylic-styrene copolymer and a wax, which can be a paraffin wax.

In U.S. Pat. No. 5,180,614 to Escabasse, a supple biodegradable sheet is described that is resistant to bursting and has poor water and other liquid absorbing power. The sheet comprises fibers, an optional moisture resisting agent, a binder, which can be poly(vinyl alcohol), a moisture retaining agent, and a sizing agent, which can be a paraffin wax.

Dettling, in U.S. Pat. No. 5,773,131, describes a paper product having a flavor seal and a vapor barrier that is produced by applying a primer coating to the paper that can include poly(vinyl alcohol), and after polymerizing the coating to form an amorphous net structure, applying a cover coating mixture suitable for generating a vapor seal. The cover coating mixture can include paraffin wax.

Dragner et al., in U.S. Pat. No. 5,795,932, describe a surface sizing composition for nonwoven substrates that includes a waxy material, that can be a paraffin wax, but is preferably a stearylated melamine, and a surfactantless vinyl polymer or copolymer emulsion that contains an alkali soluble, acid containing copolymer, which acts as the only surfactant for the waxy material.

In U.S. Pat. No. 5,928,741 to Andersen et al., laminated articles fashioned from sheets having a highly inorganically filled organic polymer matrix are described. The sheets can be coated with various materials, selected to improve water penetration, or grease and oil penetration, or to render the article substantially liquid-tight, or pressure-tight, or to increase the flexibility of the article, and poly(vinyl alcohol) and waxes are included in a list of several possible coating materials. It is stated that mixtures of the coating materials can also be used, but no particular mixture is identified as being preferred. Methods for the production of articles of a similar nature are described by Andersen et al. in U.S. Pat. Nos. 5,580,409 and 5,800,647.

In U.S. Pat. No. 6,159,612, Chu et al. describe multilayer films having a barrier layer containing a wax. The films are said to provide an effective moisture and oxygen barrier without requiring such barrier agents as polyterpenes, alicyclic hydrocarbons, or high barrier polyvinylidene chloride coatings. The films include a layer comprising an olefin polymer, and a barrier layer comprising a syndiotactic polypropylene homopolymer and a wax. They can further include an outer layer that can be coated, for example, with a poly(vinyl alcohol) coating.

Chang et al. describe a method of making a flushable film having barrier properties in U.S. Pat. No. 6,479,105. The film can have a water-dispersible substrate layer that can comprise poly(vinyl alcohol) that is covered with a coating of a low molecular weight amorphous poly(alpha-olefin) that can be admixed with a branched paraffin wax.

In WO 02/14426 to Dixit et al. (also US 2004/0005341 A1) a formulation for providing oil and grease resistance and release paper properties is described as including a fatty acid melamine and paraffin wax emulsion and a poly(vinyl alcohol). Alternatively, the formulation can include a fatty acid melamine wax and a poly(vinyl alcohol). A preferred fatty acid melamine wax is a stearylated melamine wax. The formulation can be used as a coating to provide oil and grease resistance on paper and paperboard, and can also be applied inline on a paper machine.

Despite the advances that recently have been made in the attempt to find effective and environmentally benign alternatives to fluorochemical barrier coatings, there remains a need for compounds or methods that can be used to replace the perfluorinated compounds in present commercial use as greaseproofing and waterproofing agents for paper and the like. It would be useful if such compounds and methods were cost effective and easy to apply. It would also be useful if such compounds and methods were more environmentally benign that the current fluorochemical compounds and it would be useful if such compounds and methods were totally free of such fluorochemical compounds.

SUMMARY OF THE INVENTION

Briefly, therefore the present invention is directed to a novel method of improving grease and/or water resistance of a material, the method comprising treating the material with wax and poly(vinyl alcohol).

The present invention is also directed to a novel composition for improving grease and/or water resistance of a material, the composition comprising wax and poly(vinyl alcohol).

The present invention is also directed to a novel material that has been treated with a composition comprising poly(vinyl alcohol) and wax.

The present invention is also directed to a novel material that has been treated with poly(vinyl alcohol), wax and a polyamine.

Among the several advantages found to be achieved by the present invention, therefore, may be noted the provision of compounds and methods that effectively improve the grease and/or the water resistance of a material and which are cost effective and easy to apply, the provision of such compounds and methods that are more environmentally benign that the current fluorochemical compounds, and the provision of such compounds and methods that are free of the use of fluorochemical compounds.

DETAILED DESCRIPTION OF THE PREFERRED EMBODIMENTS

In accordance with the present invention, it has been discovered that treatment of materials, such as paper, with a combination of wax and poly(vinyl alcohol) greatly improves the grease and water resistance of the materials. In preferred embodiments, the degree of improvement is more than would have been expected based merely on the additive effect of the combination. In tests with uncoated paper, coating with wax or poly(vinyl alcohol) alone provided grease resistance (reported as Kit numbers measured according to TAPPI TEST METHOD T-559 "Grease Resistance for Paper and Paperboard") of from about 1-3, even at dosage rates of up to 0.624 lbs total dry substance per 3000 $ft^2$ of paper (lb. d.s./3000 $ft^2$). In contrast, however, treatment with a combination of paraffin wax and poly(vinyl alcohol) provided protection levels of Kit number 4, even at a dosage as low as 0.156 lb d.s./3000 $ft^2$, and protection of Kit number 5 at 0.468 lbs d.s./3000 $ft^2$, and Kit number 6 at 0.624 lbs d.s./3000 $ft^2$.

The inventors have also found that such superior performance can be obtained without the use of higher, and more expensive, grades of poly(vinyl alcohol). It has been shown that the present methods can be carried out successfully with less expensive grades of poly(vinyl alcohol), such as partially hydrolyzed and intermediate hydrolyzed poly(vinyl alcohol), and that the use of higher grades, such as fully hydrolyzed or super hydrolyzed, is not required. This feature is highly advantageous in controlling the expense of the coating procedure, and improves the cost effectiveness of the innovative method.

In a further embodiment, the inventors have found that the addition of a polyamine to the combination of wax and poly(vinyl alcohol) provides additional improvement in the performance of the compositions. For example, a combination of paraffin wax, poly(vinyl alcohol), and dicyandiamide-formaldehyde condensate provided protection levels of Kit number 7 at dosage rates of 0.468 lbs d.s./3000 $ft^2$.

Any suitable poly(vinyl alcohol) can be used in the present methods and compositions. Poly(vinyl alcohol) is a polymer comprising vinyl acetate monomer units, some of which have been hydrolyzed to yield alcohol functional groups on the polymer. Poly(vinyl acetate) and poly(vinyl acetate-co-vinyl alcohol) are also included in the definition of poly(vinyl alcohol). The polymer can contain other comonomers such as ethylene, propylene, butylene, ethylene oxide, propylene oxide, and the like without departing from the scope of the invention. The poly(vinyl alcohol) can be in the physical form of a solid, an emulsion, a suspension, or a liquid solution.

The physical properties of poly(vinyl alcohol) are controlled by molecular weight and the degree of hydrolysis, and a wide range of commercial grades is offered by poly(vinyl alcohol) manufacturers. Some of the commercially available grades of poly(vinyl alcohol) are: Partially Hydrolyzed, Intermediate Hydrolyzed, Fully Hydrolyzed, and Super Hydrolyzed. The molecular weight depends on the conditions of polymerization, and the degree of hydrolysis is determined by the percent of acetate groups replaced by hydroxyl groups during the hydrolysis reaction. The specific gravity of poly(vinyl alcohol) solutions depends on concentration and temperature and is independent of grade. Poly(vinyl alcohol) reacts in a manner similar to secondary alcohols.

The poly(vinyl alcohol) employed in accordance with this invention may be any grade poly(vinyl alcohol) that is compatible with paraffin waxes and optionally with polyamines such as dicyandiamide-formaldehyde condensate and that provides improved grease resistance or improved water resistance, or both, when applied to a material, such as paper, in combination with paraffin wax and optionally a polyamine.

In a preferred embodiment, the poly(vinyl alcohol) component comprises a partially hydrolyzed poly(vinyl alcohol), typically having a percent hydrolysis of about 87%-89% and a viscosity of about 45-55 centipoise (4% aqueous solution at 20° C.).

The manufacture of poly(vinyl alcohol) involves starting with polyvinyl acetate and converting that material to poly (vinyl alcohol) generally by base-catalyzed methanolysis. Polyvinyl acetate polymerization is done by conventional processes such as, for example, solution, bulk or emulsion polymerization. The polymerization step controls the ultimate molecular weight of the poly(vinyl alcohol). Catalyst selection, temperature and solvent control the degree of polymerization.

The degree of hydrolysis of poly(vinyl alcohol) is controlled during the alcoholysis reaction and is independent of molecular-weight control. Fully hydrolyzed poly(vinyl alcohol) is obtained if methanolysis is allowed to go to completion. The reaction can be terminated by neutralizing or removing the sodium hydroxide catalyst. The addition of small amounts of water to the reactants promotes saponification of polyvinyl acetate, which consumes sodium hydroxide. The extent of hydrolysis is inversely proportional to the amount of water added. Typical degrees of hydrolysis of commercial grades of poly(vinyl alcohol) are: Super Hydrolyzed (over 99.3%), Fully Hydrolyzed (98.0-98.8%), Intermediate Hydrolyzed (91.0-96.5%, with range varying by molecular weight), and Partially Hydrolyzed (86.0-89.0, with range varying by molecular weight).

An example of a commercially-available poly(vinyl alcohol) which is partially hydrolyzed and which is suitable for use in the present invention is Celvol 840, which is available from Celanese Corporation of Dallas, Tex.

In the present invention, the poly(vinyl alcohol) can be used neat, or it can be used in combination with a defoamer. It is not uncommon to add a defoamer when using an intermediate or partially hydrolyzed grade or poly(vinyl alcohol).

Any wax can be used in the methods and compositions of the present invention. Useful waxes may be natural or synthetic, or combinations thereof, and may be macrocrystalline or microcrystalline. The wax can be obtained from animal, vegetable or mineral sources, or it may be produced synthetically. Useful waxes generally have melting points within the range of about 20° C. to about 200° C., and include animal waxes, mineral waxes, vegetable waxes, insect waxes, and synthetic waxes including: beeswax; bayberry-myrtle; candelilla; caranday; carnauba; castor bean wax; esparto grass wax; Japan wax; montan crude wax; ouricury; retamo-ceri nimbi; shellac wax; spermaceti; sugar cane wax; and wool wax-lanolin.

Of these waxes, petroleum waxes and synthetic waxes are preferred for the methods and compositions of the present invention. Synthetic waxes include the ester waxes made by esterifying acid waxes, such as montan wax, with alcohols and/or glycols. Paraffins and chlorinated paraffin waxes also are of interest as the wax components of the present methods and compositions, as are waxes produced by the emulsion polymerization of ethylene, styrene, or acrylates (weight average molecular weights of about 10,000 to about 50,000). Oxidized hydrocarbon waxes, such as those manufactured from the Fisher-Tropsch paraffins, and the microcrystalline petroleum waxes (ester-type waxes) also are useful in the methods and compositions of the present invention.

Other synthetic waxes of entirely different structure such as the fatty amides, imides, amines, and nitriles can be waxlike and can be used in the present invention. The polyoxyethylenes or carbowaxes are an important group of waxes because of their solubility properties and compatibility with fatty materials.

The petroleum waxes, particularly paraffin waxes but also the microcrystalline waxes are particularly preferred for use in the present invention. The petroleum waxes are predominantly long chain ($C_{16}$-$C_{50}$) alkane compounds. The paraffins are mostly straight-chain molecules, but may have branched claims. The microcrystalline waxes range in molecular weight from about 400 to about 700 and have average molecules of about 40 to about 50 carbon atoms. The microcrystalline waxes have more branched-chain molecules than in paraffin waxes, containing an average of three carbon atoms per side chain. Oxidized microcrystalline waxes also are useful in the compositions of the present invention. Petroleum waxes contains both solid and liquid hydrocarbons with the liquid hydrocarbons held in discrete droplets within the petroleum wax. The paraffin waxes used in the compositions of the present invention may be crude scale wax and/or fully refined wax.

Synthetic paraffin waxes are mixtures of saturated straight-chain paraffinic hydrocarbons with short side chains ($C_1$-$C_4$). The weight average molecular weight is about 700 to about 800 or about 45-60 carbon atoms per molecule.

Paraffin wax is a preferred wax for use in the present invention. Any type or grade of paraffin wax can be used in the present invention that is compatible with poly(vinyl alcohol) and optionally with a polyamine, and that provides improved resistance to grease or improved resistance to water, or both, when applied to a material such as paper in combination with poly(vinyl alcohol) and optionally with a polyamine such as dicyandiamide-formaldehyde condensate.

Preferred paraffin waxes are unbranched or sparsely branched waxy white or colorless solid hydrocarbon mixtures that can be used to make candles, wax paper, lubricants, and sealing materials. The chemical composition of a preferred paraffin wax is a mixture of predominantly non-aromatic saturated hydrocarbons with the general formula $C_nH_{(2n+2)}$ where n is preferably an integer between 12 and 50, and more preferably between 22 and 27. It is preferable that the paraffin has a melting point, or melting point range, between about 25° C. and about 200° C., and more preferably between about 47° C. and abut 65° C., and is insoluble in water. An example of a preferred paraffin wax is available from Sigma-Aldrich, Milwaukee, Wis., as Cat. No. 31,765-9, having a CAS RN of 8002-74-2, and a melting point range of 52°-58° C.

Other organic materials can be used with, or added to, the wax without departing from the scope of the invention. For example, when the wax is to be used as an aqueous emulsion, it is common to add an emulsifier to the mixture to stabilize the emulsion. A commonly used emulsifier for this purpose is a styrene-acrylate copolymer. One such material is Morez 101 (a styrene-acrylate copolymer available from Rohm & Haas). The wax, water, and the emulsifier can be intermixed with high shear to form a stable emulsion, which can then be used in suitable amounts to produce the compositions of the present invention.

In some embodiments, it is preferred that paraffin wax and poly(vinyl alcohol) be the only materials present that have a significant effect on the grease and/or water resistance of the material. This is advantageous in circumstances where it is desirable to limit the cost or complexity of the treatment. In this instance, the treatment and compositions are said to consist essentially of poly(vinyl alcohol) and paraffin wax.

Optionally, a polyamine can be a component of the present compositions. The preferred polyamine is an amine-aldehyde condensate that is the reaction product of an amine containing an active hydrogen atom and an aldehyde. Examples of the amine include guanidine, urea, dicyandiamide, melamine, aniline, ethylenediamine, diethylenetriamine, monoethanolamine, diethanolamine, and the like. Examples of the aldehyde include formaldehyde, acetaldehyde, glutaraldehyde, glyoxal, hexamethylenetetramine, and paraformaldehyde. Accordingly, examples of polyamines that are useful in the present invention include a condensation product of any one or more of the amines listed above with any one or more of the aldehydes listed above.

The reaction between the amine and aldehyde is usually conducted in aqueous solution and can be done at acid, neutral, or alkaline pH. The preferred condition is acid pH. Additional information regarding the production of suitable dicyandiamide-formaldehyde condensates can be found, for example, in U.S. Pat. No. 3,957,574 to Anderson.

A preferred polyamine for the present invention is a dicyandiamide-formaldehyde condensate. Examples of polyamines that are considered to be dicyandiamide-formaldehyde condensates, and which are useful in the invention are available from Polymer Ventures, Inc., Charleston, S.C., as RD111-013 and PC-540. RD111-013 is an acid condensation product of dicyandiamide, urea, and formaldehyde, and is available as a clear viscous solution of 46% d.s. having a viscosity of 50-250 cps and a pH of about 5.5. It is cationic and has a density of about 10 lbs/gal. PC-540 is an acid condensation product of dicyandiamide, urea, and formaldehyde and is available as a clear viscous solution of 50% d.s. having a viscosity of 10-100 cps and a pH of about 3.5. It is cationic and has a density of about 10 lbs/gal. Either of these polyamines can be used as commercially supplied.

Polyamines, and dicyandiamide-formaldehyde condensates in particular, are described in U.S. Pat. No. 6,576,086 by Ettl et al. as being useful as fixing agents in the production of paper or paperboard during paper stock draining. Similar materials are also discussed by Anderson in U.S. Pat. No. 3,957,574 as being preferred dye fixatives in a paper sizing agent. Dicyandiamide-formaldehyde condensates were also discussed as possible replacements for cationic starch in sizing agents in U.S. Pat. No. 4,222,820 to Hiskens et al., and as replacements for cationic resins used in a size for ink jet recording paper by Miyamoto in U.S. Pat. No. 4,576,867. However, none of these publications suggests the use of these polyamines in combination with a wax and a poly(vinyl alcohol) for use to improve grease and/or water resistance as is done in the present invention.

Furthermore, in U.S. Pat. No. 5,423,911 to Coutelle et al. and U.S. Pat. No. 5,660,622 to, Nikoloff, the use of dicyandiamide-formaldehyde condensates as in paper coatings is described as being undesirable for one reason or another.

In the present invention, combinations of poly(vinyl alcohol) and wax, and optionally, a polyamine, are used to provide the grease and/or water resistance improvement that has been described.

When the combination includes only poly(vinyl alcohol) and wax, the two components can be used in any amounts. However, it is preferred that the ratio of the poly(vinyl alcohol) to the wax, by weight, is within a range of about 10:90 to about 90:10, a range of about 25:75 to about 75:25 is more preferred, a range of about 40:60 to about 60:40 is even more preferred, and a range of about 45:55 to about 55:45 is yet more preferred. In one embodiment, about 44% poly(vinyl alcohol) and about 56% wax, by weight, has been found to provide improved resistance.

When a polyamine is included in the combination of the present invention, the poly(vinyl alcohol), the wax, and the polyamine can each be included in almost any relative amount. However, it has been found to be preferred that the three components be used in combinations in which the poly(vinyl alcohol) is within a range of about 3 to about 74% by wt. d.s. (where the dry solids (d.s.) include only the three components of interest), the wax is within a range of about 13-96% by wt. d.s., and the polyamine is within a range of about 0.5-13% by wt. d.s. It is more preferred that the three components be used in combinations in which the poly(vinyl alcohol) is within a range of about 22 to about 68% by wt. d.s., the wax is within a range of about 25-74% by wt. d.s., and the polyamine is within a range of about 3-12% by wt. d.s. It is even more preferred that the three components be used in combinations in which the poly(vinyl alcohol) is within a range of about 38 to about 68% by wt. d.s., the wax is within a range of about 25-55% by wt. d.s., and the polyamine is within a range of about 6-12% by wt. d.s.

Alternatively, it has been found that the present methods and compositions can be achieved with combinations of poly(vinyl alcohol), wax, and polyamine having a weight ratio of the three components, respectively, of about 4/5/1, or 5/4/1, or 4.5/4.5/1.

In the present invention, the poly(vinyl alcohol) and the wax, and optionally the polyamine, can be intermixed into a composition that can be administered to the material to be treated. Alternative, the components can be administered separately to the material to be treated. If the components are administered separately, they can be administered at approximately the same time, or they can be administered at different times. By way of example, separate solutions or emulsions of each component can be administered to the material to be treated, or the solutions or emulsions can be intermixed and then applied to the material.

The poly(vinyl alcohol), wax, and optionally, the polyamine, of the present invention can be present in the solutions or emulsions, or in the compositions of the invention, in almost any concentration. It is preferred that the present compositions contain from about 0.5% to about 60% by weight dry substance, based only on the poly(vinyl alcohol), wax, and polyamine, more preferred that they contain from about 1% to about 50% by wt. d.s., and even more preferred that they contain from about 20% to about 40% by wt. d.s. The present compositions can be diluted prior to use, and after dilution, a d.s. of about 3% would be typical.

The present components are applied in a sufficient amount so as to provide the level of performance desired, and that amount may vary widely according to the substrate used and its characteristics, such as porosity and surface roughness, as well as the rheological characteristics of the coating composition, such as viscosity. When the present compositions are applied to sheet material having a measurable surface area, such as paper, for example, typical use rates for the present compositions, whether they comprise poly(vinyl alcohol) and wax, or have, in addition, a polyamine, range from about 0.1 to about 2 lbs dry solids (d.s.) per 3000 $ft^2$ of surface of the material to be treated. It is preferred, however, that the components be applied at a rate of between about 0.15 and about 0.75 lbs d.s./3000 $ft^2$, even more preferred is an application rate of between about 0.3 and 0.7 lbs d.s./3000 $ft^2$, and yet more preferred is an application rate of between about 0.4 and 0.7 lbs d.s./3000 $ft^2$.

As mentioned above, materials other than the poly(vinyl alcohol), wax, and optional polyamine can be used along with these ingredients without departing from the scope of the invention. It has been shown, for example, that it is often desirable to add an emulsifier along with the wax in order to form a stable aqueous emulsion. Other materials, such as colorants, dyes, preservatives, anti-fungal agents, surfactants, and the like, can also be used along with the components of the present method, or as ingredients in the present compositions.

Although it is possible, and even desirable, to provide and use each of the components in aqueous solutions or emulsions, that is not required. In certain circumstances, for example, it might be useful to provide one or more of the components in an organic solvent, or in a molten form, or even in a dry form, such as a powder or flake.

The methods and compositions of the present invention can be used to treat materials of any sort that would benefit from an improvement in resistance to grease, or resistance to water, or both. The components of the present methods can be applied as coatings or in any other fashion at any point during the manufacture, packaging, storage, or use of the material to be treated.

When the present methods and compositions are used to form a coating, examples of materials to which they can be applied include packaging and non-packaging materials such as paper, cardboard, bakery board, butter and margarine chips, candy board, cup stock, frozen food containers, plate stock, artist's papers, asphalt laminations, carbonizing tissue, carton overwraps, cover and text papers, envelopes, garbage and trash bags, label papers, paper placemats, release papers, soap containers, wallpaper, liner board, folding cartons, multiwall bags, flexible packaging, duplicator and reproduction papers, support cards and medical dressings.

In addition, the present methods and compositions can be used to improve grease, oil, and moisture resistance of asphalt, wood, fabric, yarn, thread, carpets, upholstery, paperboard, formed articles, medical dressings, and the like.

Present materials to be treated are usually porous, and therefore not impervious to water and oil, although such resistance may vary widely. The present materials are commonly in sheet form and include substrates comprised of non-woven and woven polymers such as fabrics, and cellulose-based materials, such as paper and cardboard substrates, and the like. As used herein, the terms "sheet material" refer to a material in a form that has length and width dimensions that are each significantly greater than the thickness of the material. Examples of sheet materials include paper, paperboard, housewrap, tarpaper, and the like. The amount of sheet materials can often be characterized in terms of surface area, and the dosage rate of material that is added to a sheet material can be expressed on the basis of the surface area of the material. An example of this type of measurement is a dosage rate expressed as lbs. per $ft^2$.

In a preferred embodiment, the paper comprises a porous sheet material made of a cellulosic material, or a cellulose-based material. Such paper sheet materials include, for example, corrugated paperboard (or "cardboard"), newsprint paper, uncorrugated Kraft paper stock, pan liner paper stock, and the like. In addition to paper and paper-like materials, other cellulose-based sheet materials, such as pressed board, may also be suitable. It is also possible to use other fibrous materials for the substrate sheet material.

In a preferred embodiment, the present invention is used to improve the grease and/or water resistance of paper. When used to treat paper, the methods and compositions can be added to the wet end of a typical Fourdrinier machine at the wet end, or they can be used to coat paper after it has been dried.

When the methods and compositions are used as a coating, particularly on paper, the components may be applied as a solution, emulsion, or dispersion, by roll coater, brush, doctor blade or blade coater, sprayer or other such suitable application means. Typically, the coated materials are dried after the present composition has been applied.

After the application of the present composition, further coatings or treatments may be applied to the material. Such coatings could include heat shielding coatings, UV-resistant coatings, coatings with specific chemical resistance, or the like.

The coated material may be formed into a shaped article by means other than folding and gluing, such as, for example, by pressure-forming. Such shaped articles may be used for cooking or baking purposes. For example, the coated material may be used to make a container for storing food on a shelf (such as for storing pet food) while preventing penetration of grease, oil and/or water through the material. Or the coated material may be used to form a container such as a baking tray. Likewise, the coated material may be used to form a food receptacle such as a paper plate. Or the coated material may be used for fast-food containers, such as boxes for fried chicken, or food wrappers, such as wrapping materials for hamburgers and sandwiches. Thus, the coated material may be used for any of a variety of applications as a food container, wrapper or receptacle.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples all percentages are given on a weight basis unless otherwise indicated.

EXAMPLE 1

This example shows the preparation, application and efficacy of compositions of the present invention as coatings for paper.

Paper sheets were supplied from a paper mill in Wisconsin. Production non-coated paper 20 and 20.5 pounds per 3000 square foot was the basis weight.

Sheets were coated with a Gardco automated drawdown machine (available from Paul N. Gardner Company, Inc., Pompano Beach, Fla.) running at 1.5 cm/second, using various drawdown rod sizes to give coat weights ranging from 0.05 to 2 dry pounds/3000 square feet.

Grease resistance tests were conducted in accordance with TAPPI TEST METHOD T-559 "Grease Resistance for Paper and Paperboard"

Compositions A, B, and C, were made up as aqueous solutions or emulsions with the various components of the present compositions.

Composition A (Poly(Vinyl Alcohol) Solution in Water).

Distilled water (450 g) was added to a 1-liter glass reaction flask fitted with a condenser, and temperature probe. Agitation was started using an overhead mixer and a glass rod fitted with a half moon mixing blade. Celvol 840 (50 g), a partially hydrolyzed poly(vinyl alcohol) (PVOH) available from Celanese Ltd., was slowly poured into the vortex to ensure full wetting of the PVOH particles. The temperature was then increased to 85-90° C. and the solution was allowed to cook for 1 hour until the PVOH was fully dissolved.

Composition B (Solution of Poly(Vinyl Alcohol) and Polyamine in Water)

Distilled water (439.5 g) was added to a 1-liter glass reaction flask fitted with a condenser, and temperature probe. Agitation was started using an overhead mixer and a glass rod fitted with a half moon mixing blade. Then 15.5 g of a 50% active urea-dicyandiamide-formaldehyde copolymer (polyamine) was added. Celvol 840 (45 g) was slowly poured into the vortex to ensure full wetting of the PVOH particles. The temperature was then increased to 85-90° C. and the solution was allowed to cook for 1 hour until the PVOH was fully dissolved.

Composition C (Emulsion of Paraffin Wax in Water with Styrene-acrylate Copolymer as an Emulsion Stabilizer)

Distilled water (300 g), 50 g of Morez 101 (a styrene-acrylate copolymer available from Rohm & Haas), and 150 g of paraffin wax (Sigma-Aldrich 52-58° C. melting point) was added to a 1-liter glass reaction flask fitted with a condenser, and temperature probe. Agitation was started using an overhead mixer and a glass rod fitted with a half moon mixing blade. The reactor was heated to 80° C. and allowed to mix for 1 hour until booth the Morez and paraffin was completely melted. A lab homogenizer (Ultra Turrax T25 from IKA Works, Inc.) was the placed in the reactor and the reactor was allowed to cool to ~60° C. At 60° C. the homogenizer was turned on at 24,000 rpm for several minutes.

Compositions D-J (Mixtures of Wax and PVOH and Optionally with Polyamine)

Compositions D-J where made in accordance with the relative amounts of components as shown in Table 1. The appropriate amount of Composition A or Composition B was placed in a 500 ml beaker fitted with an over head mixing shaft, and the appropriate amount of Example C was slowly added with agitation until the blend was smooth. Table 2 shows the amounts of each of the three ingredients in each of Compositions A-J in terms of the percent by weight of the component relative to the dry weight of the total amounts of wax, poly(vinyl alcohol) and urea-dicyandiamide-formaldehyde copolymer condensate in the composition. Accordingly, any amount of other materials, such as emulsifiers, and the like, are not reflected in the calculation shown in Table 2.

TABLE 1

Grease and water resistance-improving compositions of the present invention having various relative amounts of poly(vinyl alcohol) and wax.

| Composition | Weight Ratio (g/g) |
|---|---|
| D | B/C (95/5) |
| E | B/C (90/10) |
| F | B/C (70/30) |
| G | B/C (50/50) |
| H | B/C (30/70) |
| I | B/C (10/90) |
| J | A/C (70/30) |

TABLE 2

Relative amounts of components in the compositions of Table 1 in terms of percent dry weight.

| Composition | PVOH[a] (% by wt. d.s.)[d] | Wax[b] (% by wt. d.s.)[d] | Polyamine[c] (% by wt. d.s.)[d] |
|---|---|---|---|
| A | 100 | 0 | 0 |
| B | 85.3 | 0 | 14.7 |
| C | 0 | 100 | 0 |
| D | 74.2 | 13 | 12.8 |
| E | 67.5 | 25 | 11.6 |
| F | 38.4 | 54.9 | 6.6 |
| G | 22.2 | 74 | 3.8 |
| H | 11.2 | 86.9 | 1.9 |
| I | 3.2 | 96.2 | 0.6 |
| J | 43.8 | 56.2 | 0 |
| Control[e] | 0 | 0 | 0 |

Notes:
[a]PVOH is poly(vinyl alcohol) Celvol 840, from Celanese Corporation.
[b]Wax is paraffin wax having a melting point of 52°-58° C. from Sigma-Aldrich.
[c]Polyamine is dicyandiamide-formaldehyde condensate.
[d](% by wt. d.s.) means the percent of the component relative to the total amount of PVOH, Wax, and Polyamine.
[e]In the control sample, the paper had no treatment All compositions were diluted with distilled water to 2% solids before coating the base sheets. All sheets where coated using a Gardco Automated Draw Down Machine to obtain a specific wet film of coating and then dried on a LabTech Instruments Inc., Speedy Dryer for 3 minutes at 105° C. Grease resistance, reported as Kit numbers (Kit #'s) determined by using TAPPI TEST METHOD T-559, were then calculated. In the last column on the right, the 0.1 ml water drop size is an indication of the wetting of the sheet and water repellency. In this test, distilled water (0.1 ml) was applied to the coated sheets using an automatic pipette and the diameter of the water drop on the sheet was measured with a ruler. The larger the water drop diameter, the more wettable the sheet and the lower the water repellency. Those results are shown in Table 3.

TABLE 3

Kit numbers for grease resistance and water repellency for paper treated with the compositions shown in Tables 1 and 2 at various dosage rates.

| Composition | Weight Ratio (B/C) | Drawdown Rod # 20 Kit #'s @ Pounds dry/3000 ft² Dosage 0.624 | 15 0.468 | 10 0.312 | 5 0.156 | Size of 0.1 ml water drop (mm) |
|---|---|---|---|---|---|---|
| Using 20.5 lb/3000 ft² Base Sheet | | | | | | |
| D | 95/5 | 4 | 5 | 4 | <3 | 8 |
| E | 90/10 | 8 | 7 | 5 | 3 | 8 |
| F | 70/30 | 6 | 7 | 6 | 5 | 7 |
| G | 50/50 | 5 | 5 | 5 | 4 | 7 |
| H | 30/70 | 5 | 5 | 4 | 4 | 7 |
| I | 10/90 | 5 | 5 | 4 | 4 | 7 |
| Using 20 lb/3000 ft² Base weight | | | | | | |
| A | Composition A | 2 | 2 | | 1 | 10 |
| B | Composition B | 2 | 1 | | 1 | 10 |
| C | Composition C | 3 | 3 | | 3 | 7 |
| F | 70/30 (B/C) | 7 | 6 | | 4 | 7 |
| J | 70/30 (A/C) | 6 | 5 | | 4 | 7 |
| Control | No additives | 0 | 0 | 0 | 0 | 12 |

Discussion:

As the data show, compositions A, B, and C alone as a coating at various dosages add little to no grease/oil resistance to the paper substrate. At even the highest levels of application, the highest Kit number obtained was 3. However, upon blending Composition A (PVOH) and Composition C (paraffin wax) a noted increase in Kit number is observed (Kit number 2-3 up to Kit number 5-6), even at the same total dosage of solids. The incorporation of the polyamine into the combination with poly(vinyl alcohol) and wax (noted as Composition F), but at the same level of solids dosage, further increases the Kit number to 6-7.

The results for Compositions D-I show that an optimum in grease/oil resistance is established with the blending of the paraffin wax to the poly(vinyl alcohol)/polyamine blend, as indicated by the data in Tables 2 and 3.

As for water repellency, the uncoated sheet resulted in a water drop diameter of 12 mm compared to a range of 7-8 mm for the treated samples. Furthermore, the uncoated sheet resulted in the water spreading over time and soaking into the sheet, whereas the sheets coated with Compositions D-I, as well as Composition C, showed smaller water drop diameters, thus indicating improved water repellency, and showed no drop spreading over time and no soaking in of the water drop. Paper coated with Compositions A and B showed slightly improved water repellency over the control, however there was some droplet spread over time, but the drops did not soak into the sheets.

It can be concluded from the data that a combination of wax and poly(vinyl alcohol) provided significantly improved grease and water resistance to papers coated with the combination. Because the improvement was obtained without any increase at all in the total amount of solids used for the treatment, It is believed that such an increase is unexpected. Furthermore, when a polyamine was added to the combination, the grease and water resistance was further increased, and again without any increase in the total amount of solids used in the treatment. Therefore, it is believed that the addition of a polyamine to the combination of wax and poly(vinyl alcohol) used as a paper coating provides an unexpected improvement in the grease and/or water resistance of the coated material.

All references cited in this specification, including without limitation all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results obtained.

As various changes could be made in the above methods and compositions by those of ordinary skill in the art without departing from the scope of the invention, it is intended that all matter contained in the above description shall be interpreted as illustrative and not in a limiting sense. In addition it should be understood that aspects of the various embodiments may be interchanged both in whole or in part.

What is claimed is:

1. A method of improving grease and/or water resistance of a material, the method comprising treating the material with a combination of wax poly(vinyl alcohol), and a polyamine, wherein the polyamine is an amine-aldehyde condensate that is the reaction product of an amine containing an active hydrogen atom and an aldehyde.

2. The method according to claim 1, wherein the wax is an animal wax, a mineral wax, a vegetable wax, a synthetic wax or a mixture thereof.

3. The method according to claim 2, where n is an integer between 22 and 27.

4. The method according to claim 1, wherein the wax is selected from the group consisting of paraffin wax, beeswax, bayberry-myrtle, candelilla, caranday, carnauba, castor bean wax, esparto grass wax, Japan wax, montan crude wax, ouricury, retamo-ceri nimbi, shellac wax, spermaceti, sugar cane wax, wool wax-lanolin, polyethylene wax, poly(ethylene-acrylate) wax, or a mixture of any two or more of these.

5. The method according to claim 1, wherein the wax is a paraffin wax.

6. The method according to claim 5, wherein the paraffin wax has a melting point range between about 47° C. and about 65° C., and is insoluble in water.

7. The method according to claim 1, wherein the paraffin wax comprises a mixture of predominantly non-aromatic saturated hydrocarbons with the general formula $C_nH_{(2n+2)}$, where n is an integer between 12 and 50.

8. The method according to claim 1, wherein the poly(vinyl alcohol) is selected from the group consisting of super hydrolyzed poly(vinyl alcohol), full hydrolyzed poly(vinyl alcohol), intermediate hydrolyzed poly(vinyl alcohol), partially hydrolyzed poly(vinyl alcohol), and mixtures thereof.

9. The method according to claim 1, wherein the poly(vinyl alcohol) is intermediate hydrolyzed poly(vinyl alcohol) or partially hydrolyzed poly(vinyl alcohol).

10. The method according to claim 1, wherein the treatment comprises applying the combination to a sheet material at the combined rate of about 0.1 to about 1.0 lbs dry solids (d.s.) per 3000 ft² of surface of the material.

11. The method according to claim 1, wherein the treatment comprises applying the combination to a sheet material at the combined rate of about 0.15 to about 0.75 lbs d.s./3000 ft$^2$ of surface of the material.

12. The method according to claim 1, wherein the treatment comprises applying the combination to a sheet material at the combined rate of about 0.15 to about 0.75 lbs d.s./3000 ft$^2$ of surface of the material.

13. The method according to claim 1, wherein the treatment comprises applying the combination to a sheet material at the combined rate of about 0.15 to about 0.75 lbs d.s./3000 ft$^2$ of surface of the material.

14. The method according to claim 1, wherein the amine is selected from the group consisting of guanidine, urea, dicyandiamide, melamine, aniline, ethylenediamine, diethylenetriamine, monoethanolamine, diethanolamine, and mixtures thereof.

15. The method according to claim 1, wherein the aldehyde is selected from the group consisting of formaldehyde, acetaldehyde, glutaraldehyde, glyoxal, hexamethylenetetramine, paraformaldehyde, and mixtures thereof.

16. The method according to claim 1, wherein the polyamine comprises a dicyandiamide-formaldehyde condensate.

17. The method according to claim 1, wherein the treatment comprises applying the poly(vinyl alcohol) and the wax and the polyamine in amounts wherein the poly(vinyl alcohol) is within a range of about 3 to about 74% by wt. d.s., the wax is within a range of about 13-96% by wt. d.s., and the polyamine is within a range of about 0.5-13% by wt. d.s., wherein the dry solids basis includes only the poly(vinyl alcohol), wax, and polyamine.

18. The method according to claim 1, wherein the treatment comprises applying the poly(vinyl alcohol) and the wax and the polyamine in amounts wherein the poly(vinyl alcohol) is within a range of about 22 to about 68% by wt. d.s., the wax is within a range of about 25-74% by wt. d.s., and the polyamine is within a range of about 3-12% by wt. d.s., wherein the dry solids basis includes only the poly(vinyl alcohol), wax, and polyamine.

19. The method according to claim 1, wherein the treatment comprises applying the poly(vinyl alcohol) and the wax and the polyamine in amounts wherein the poly(vinyl alcohol) is within a range of about 38 to about 68% by wt. d.s., the wax is within a range of about 25-55% by wt. d.s., and the polyamine is within a range of about 6-12% by wt. d.s., wherein the dry solids basis includes only the poly(vinyl alcohol), wax, and polyamine.

20. The method according to claim 1, wherein the treatment comprises applying poly(vinyl alcohol), wax, and polyamine in a weight ratio of the three components, respectively, of about 4/5/1, or 5/4/1, or 4.5/4.5/1.

21. The method according to claim 1, wherein the material is selected from the group consisting of paper, cardboard, bakery board, butter and margarine chips, candy board, cup stock, frozen food containers, plate stock, artist's papers, asphalt laminations, carbonizing tissue, carton overwraps, cover and text papers, envelopes, garbage and trash bags, label papers, paper placemats, release papers, soap containers, wallpaper, liner board, folding cartons, multiwall bags, flexible packaging, duplicator and reproduction papers, support cards, asphalt, wood, fabric, yarn, thread, carpets, upholstery, paperboard, formed articles and medical dressings.

22. The method according to claim 1, wherein the material comprises paper.

23. The method according to claim 22, wherein the treatment results in an improvement in grease resistance as measured by Kit number and the grease resistance is improved by at least one Kit number.

24. The method according to claim 22, wherein the treatment results in an improvement in grease resistance as measured by Kit number and the grease resistance is improved by at least two Kit numbers.

25. The method according to claim 22, wherein the treatment results in an improvement in grease resistance as measured by Kit number and the grease resistance is improved by at least three Kit numbers.

26. A composition for improving grease and/or water resistance of a material, the composition comprising wax, poly(vinyl alcohol), and a polyamine, wherein the polyamine is an amine-aldehyde condensate that is the reaction product of an amine containing an active hydrogen atom and an aldehyde.

27. The composition according to claim 26, wherein the wax is an animal wax, a mineral wax, a vegetable wax, a synthetic wax or a mixture thereof.

28. The composition according to claim 26, wherein the wax is selected from the group consisting of paraffin wax, beeswax, bayberry-myrtle, candelilla, caranday, carnauba, castor bean wax, esparto grass wax, Japan wax, montan crude wax, ouricury, retamo-ceri nimbi, shellac wax, spermaceti, sugar cane wax, wool wax-lanolin, polyethylene wax, poly(ethylene-acrylate) wax, or a mixture of any two or more of these.

29. The composition according to claim 26, wherein the wax is paraffin wax.

30. The composition according to claim 29, wherein the paraffin wax comprises a mixture of predominantly non-aromatic saturated hydrocarbons with the general formula $C_nH_{(2n+2)}$, where n is an integer between 12 and 50.

31. The composition according to claim 30, where n is an integer between 22 and 27.

32. The composition according to claim 29, wherein the paraffin wax has a melting point range between about 47° C. and about 65° C., and is insoluble in water.

33. The composition according to claim 26, wherein the poly(vinyl alcohol) is selected from the group consisting of super hydrolyzed poly(vinyl alcohol), full hydrolyzed poly(vinyl alcohol), intermediate hydrolyzed poly(vinyl alcohol), partially hydrolyzed poly(vinyl alcohol), and mixtures thereof.

34. The composition according to claim 26, wherein the poly(vinyl alcohol) is intermediate hydrolyzed poly(vinyl alcohol) or partially hydrolyzed poly(vinyl alcohol).

35. The composition according to claim 26, wherein the composition includes the poly(vinyl alcohol) and the wax in a ratio, by weight, that is within a range of about 10:90 to about 90:10.

36. The composition according to claim 26, wherein the composition includes the poly(vinyl alcohol) and the paraffin wax in a ratio, by weight, that is within a range of about 40:60 to about 60:40.

37. The composition according to claim 26, wherein the amine is selected from the group consisting of guanidine, urea, dicyandiamide, melamine, aniline, ethylenediamine, diethylenetriamine, monoethanolamine, diethanolamine, and mixtures thereof.

38. The composition according to claim 26, wherein the aldehyde is selected from the group consisting of formaldehyde, acetaldehyde, glutaraldehyde, glyoxal, hexamethylenetetramine, paraformaldehyde, and mixtures thereof.

39. The composition according to claim 26, wherein the polyamine comprises a dicyandiamide-formaldehyde condensate.

40. The composition according to claim 26, comprising the poly(vinyl alcohol) within a range of about 3 to about 74% by wt. d.s., the wax within a range of about 13-96% by wt. d.s., and the polyamine within a range of about 0.5-13% by wt. d.s., wherein the dry solids basis includes only the poly(vinyl alcohol), wax, and polyamine.

41. The composition according to claim 26, comprising the poly(vinyl alcohol) within a range of about 22 to about 68% by wt. d.s., the wax within a range of about 25-74% by wt. d.s., and the polyamine within a range of about 3-12% by wt. d.s., wherein the dry solids basis includes only the poly(vinyl alcohol), wax, and polyamine.

42. The composition according to claim 26, comprising the poly(vinyl alcohol) within a range of about 38 to about 68% by wt. d.s., the wax within a range of about 25-55% by wt. d.s., and the polyamine within a range of about 6-12% by wt. d.s., wherein the dry solids basis includes only the poly(vinyl alcohol), wax, and polyamine.

43. The composition according to claim 26, comprising poly(vinyl alcohol), wax, and polyamine in a weight ratio of the three components, respectively, of about 4/5/1, or 5/4/1, or 4.5/4.5/1.

44. A material that has been treated with poly(vinyl alcohol), wax and a polyamine, wherein the polyamine is an amine-aldehyde condensate that is the reaction product of an amine containing an active hydrogen atom and an aldehyde.

45. The material according to claim 44, wherein the material comprises paper and the wax comprises paraffin wax.

* * * * *

UNITED STATES PATENT AND TRADEMARK OFFICE
CERTIFICATE OF CORRECTION

| | |
|---|---|
| PATENT NO. | : 7,282,273 B2 |
| APPLICATION NO. | : 11/259491 |
| DATED | : October 16, 2007 |
| INVENTOR(S) | : Christopher B. Murphy and Jon O. Fabri |

It is certified that error appears in the above-identified patent and that said Letters Patent is hereby corrected as shown below:

Column 11

Line 57, replace the term "booth" with the term -- both --.

Line 59, replace the first term "the" with the term -- then --.

Signed and Sealed this

Eighteenth Day of March, 2008

JON W. DUDAS
*Director of the United States Patent and Trademark Office*